(12) United States Patent
Yan et al.

(10) Patent No.: US 9,686,256 B2
(45) Date of Patent: Jun. 20, 2017

(54) METHOD AND SYSTEM FOR ACCESSING NETWORK THROUGH PUBLIC DEVICE

(75) Inventors: Zhengqing Yan, Shenzhen (CN); Shiwei Zhang, Shenzhen (CN); Tao Fu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 762 days.

(21) Appl. No.: 13/520,236

(22) PCT Filed: Oct. 18, 2010

(86) PCT No.: PCT/CN2010/077835
§ 371 (c)(1),
(2), (4) Date: Jul. 2, 2012

(87) PCT Pub. No.: WO2011/088693
PCT Pub. Date: Jul. 28, 2011

(65) Prior Publication Data
US 2012/0284407 A1    Nov. 8, 2012

(30) Foreign Application Priority Data

Jan. 20, 2010    (CN) .......................... 2010 1 0002850

(51) Int. Cl.
*G06F 15/173*    (2006.01)
*H04L 29/06*    (2006.01)
(Continued)

(52) U.S. Cl.
CPC ........ *H04L 63/08* (2013.01); *H04M 3/42263* (2013.01); *H04L 63/126* (2013.01); *H04L 63/30* (2013.01); *H04M 3/2281* (2013.01)

(58) Field of Classification Search
CPC ....... H04L 67/10; H04L 63/083; H04L 67/18; H04L 61/2514; H04L 63/101;
(Continued)

(56) References Cited

U.S. PATENT DOCUMENTS 6,728,536 B1 * 4/2004 Basilier et al. ............ 455/432.1
7,808,996 B2 * 10/2010 Chung ................ H04L 61/6031
370/352

(Continued)

FOREIGN PATENT DOCUMENTS

CN    1486029 A    3/2004
CN    1571350 A    1/2005
(Continued)

OTHER PUBLICATIONS

International Search Report for PCT/CN2010/077835 dated Jan. 27, 2011.
(Continued)

*Primary Examiner* — Imad Hussain
(74) *Attorney, Agent, or Firm* — Banner & Witcoff, Ltd.

(57) ABSTRACT

A method and system for accessing a network over a public device are provided in the present invention. The method includes: a user inputting an Access Identifier (AID) and authentication information over the public device, and initiating a network access request; after receiving the network access request, an Access Service Node (ASN) transmitting the received network access request to an Authentication Center (AC) to authenticate validity of the User's AID information, and forwarding a network access response returned by the AC to the public device; and after the public device receives the network access response, if the User's AID information is authenticated by the AC to be valid, the public device using the User's AID as a virtual AID, and using the virtual AID to transmit/receive messages of the user.

22 Claims, 5 Drawing Sheets

(51) Int. Cl.
*H04M 3/42* (2006.01)
*H04M 3/22* (2006.01)

(58) Field of Classification Search
CPC ....... H04L 63/20; H04L 45/04; H04L 45/745; H04L 67/22; H04L 12/28; H04L 12/2856; H04L 45/00; H04L 63/08; H04L 63/126; H04L 63/30; H04M 3/42263; H04M 3/2281
USPC ........................................................ 709/225
See application file for complete search history.

(56) References Cited

U.S. PATENT DOCUMENTS

| | | | |
|---|---|---|---|
| 7,870,153 B2* | 1/2011 | Croft et al. | 707/781 |
| 7,936,710 B2* | 5/2011 | Gregorio Rodriguez et al. | 370/328 |
| 8,151,322 B2* | 4/2012 | Chen et al. | 726/4 |
| 8,347,063 B2* | 1/2013 | Panesar | G06F 12/10 710/3 |
| 8,838,488 B1* | 9/2014 | Breau et al. | 705/34 |
| 2002/0007411 A1* | 1/2002 | Shaked et al. | 709/229 |
| 2004/0166874 A1* | 8/2004 | Asokan et al. | 455/456.1 |
| 2005/0026596 A1* | 2/2005 | Markovitz | 455/411 |
| 2008/0028445 A1* | 1/2008 | Dubuc et al. | 726/5 |
| 2008/0288658 A1* | 11/2008 | Banga et al. | 709/245 |
| 2009/0013066 A1* | 1/2009 | Pecus | 709/223 |
| 2011/0261800 A1* | 10/2011 | You | H04W 8/12 370/338 |
| 2012/0278874 A1* | 11/2012 | Yan | H04L 61/103 726/7 |
| 2013/0125246 A1* | 5/2013 | Yan | H04L 63/08 726/28 |

FOREIGN PATENT DOCUMENTS

| | | |
|---|---|---|
| CN | 1845491 A | 10/2006 |
| CN | 101127663 A | 2/2008 |
| CN | 101217823 A | 7/2008 |
| CN | 101355564 A | 1/2009 |
| CN | 101369893 A | 2/2009 |
| JP | 2009-175923 A | 8/2009 |
| KR | 2004-0034501 A | 4/2004 |
| KR | 2006-0029047 A | 4/2006 |

OTHER PUBLICATIONS

European Search Report of EP10843733, dated Oct. 7, 2016.
Rui Tu et al; UCEN, User Centric Enterprise Network, 10th International Conference on Advanced Communication Technology, 2008, ICACT 2008, IEEE, Feb. 17, 2008.pp. 66-71.
Li Y et al: Supporting Personal Mobility 1-12 for Nomadic Computing Over the Internet, Mobile Computing and Communications Review, ACM, New Yor, US., vol. 1, Apr. 1, 1997, pp. 22-31.
Alfredo Matos et al: Embedding identity in Mobile Environments, Mobiarch 07 Proceedings of 2nd ACM/IEE Internatiional Workshop on Mobility in the Evolving Internet Architecture, ACM, New York, U.S. Aug. 27, 2007, pp. 1-8.
An Efficient Approach to Map Identity onto Locator, Ping Dong, et al., The International Conference of Mobile Technology, Sep. 2008, 7 pages.

* cited by examiner

METHOD AND SYSTEM FOR ACCESSING NETWORK THROUGH PUBLIC DEVICE

TECHNICAL FIELD

The present invention relates to the mobile communication field and the internet field, and in particular, to a method and system of accessing a network over a public device.

BACKGROUND OF THE RELATED ART

In the existing Internet Protocol (IP) networks, when people surf the internet over a public network, the IP address of the public device is directly used to communicate with other users, and network regulatory agencies can not track and trace a user accessing the network over the public device. For example, in the existing networks, the identity document needs to be shown for surfing the Internet. However, many Internet cafes still cannot identify the authenticity of the document, and even a certain common document provided by the Internet cafes can be used to surf the internet if there is no legal document. This brings great difficulties to the tracking and tracing by the network regulatory agencies.

In addition, in the existing networks, due to the duality of Identity and location of the traditional IP addresses, the user can log in his/her own service account such as mail, Internet bank etc. over the public device, but cannot achieve binding an IP of the User's network layer to a service of the application layer. Therefore, once the account is lost, a great loss will be brought to the user. If the binding between the IP of the user network layer and the service of the application layer is implemented over the traditional IP technologies, when accessing the network over the public device, the user cannot access his/her own service of the application layer due to the difference of the IP addresses of the network layer. While for the network regulatory agencies, due to the account and the User's IP cannot be bound, the regulation on the user is also reduced.

In conclusion, the traditional IP technologies at present have the following problems:

1. Due to the traditional IP addresses having the duality of Identity and location, the regulatory agencies cannot effectively track and trace the user accessing the network over the public device, which not only has potential safety hazard, but also brings difficulties to the fight against illegal and criminal activities; and 2. In addition, the duality of Identity and location for the traditional IP addresses further enables the user not to bind the IP of the network layer to the service of the application layer, thus not being able to more effectively ensure the security of the service of the application layer.

SUMMARY OF THE INVENTION

The technical problem to be solved by the present invention is to provide a method and system for accessing a network over a public device, which can perform effective tracking and tracing on the user who accesses the network over the public device in a Subscriber Identifier and Locator Identifier Separation Network.

In order to solve the above problem, the present invention provides a method of accessing a network over a public device, applied to a Subscriber Identifier & Locator Separation Network, comprising:

a user inputting an Access Identifier (AID) and authentication information over the public device, and initiating a network access request;

after receiving the network access request, an Access Service Node (ASN) transmitting the received network access request to an Authentication Center (AC) to authenticate validity of the User's AID information, and forwarding a network access response returned by the AC to the public device; and after the public device receives the network access response, if the User's AID information is authenticated by the AC to be valid, the public device using the User's AID as a virtual AID, and using the virtual AID to transmit/receive messages of the user.

Preferably, the AC is used to store the User's AID and the authentication information in the network, and after receiving the network access request of the user, performing the following authentication on the validity of User's AID information: locally inquiring corresponding authentication information according to the User's AID in the network access request, and if the inquired authentication information is in accordance with the authentication information in the network access request, determining that the user passes the authentication; and if the inquired authentication information is not in accordance with the authentication information in the network access request, determining that the user does not pass the authentication.

Preferably, if the AC determines that the user passes the authentication, the User's AID is included in the returned network access response.

Preferably, after the ASN receives the network access response, if the User's AID information is authenticated by the AC to be valid, the User's AID is attached, a mapping relationship between the User's AID and a Route Identifier (RID) of the ASN is established, and the mapping relationship is reported to an Identification and Location Register (ILR) of the user.

Preferably, after the ASN receives the network access response, if the User's AID information is authenticated by the AC to be valid, a mapping table between the User's AID and an AID of the public device is established.

Preferably, the ASN sets an attribute of the User's AID as a virtual AID while establishing the mapping table between the User's AID and the AID of the public device, and inquires the mapping table to obtain the AID of the public device and performs traffic statistic or charging on the public device when a message with the virtual AID being a source address or a destination address is received.

Preferably, the ASN prohibits the managed public device from accessing a user or device except for the AC.

Preferably, after the user accesses the network over the public device and is in an online state in the network, when the user is offline, the user transmits an offline request over the public device, and the ASN transmits the offline request to the AC;

after deleting the online state of the user in the network, the AC transmits an offline request response to the ASN;

the ASN releases the attachment of the User's AID, and requests the ILR to delete the mapping relationship between the User's AID and the RID of the ASN; and meanwhile, deletes the mapping table between the User's AID and the AID of the public device, and transmits the offline request response to the public device; and after receiving the offline request response, the public device deletes the User's virtual AID.

The present invention further provides a system of accessing a network over a public device, applied to a Subscriber Identifier and Locator Separation Network, comprising: an Access Service Node (ASN), a public device and an Authentication Center (AC), wherein, the public device is configured to transmit a network access request to the ASN according to an Access identifier (AID) and authentication information which are input by a user; after receiving a network access response, if the User's AID information is authenticated by the AC to be valid, use the User's AID as a virtual AID, and use the virtual AID to transmit/receive a message of the user;

the ASN is configured to transmit the network access request to the AC after receiving the network access request; and forward the network access response returned by the AC to the public device;

the AC is configured to perform authentication on the validity of the User's AID information, and return the network access response to the ASN.

Preferably, the system further comprises an Identification & Location Register (ILR), wherein, the ASN is further configured to after receiving the network access response, if the User's AID information is authenticated by the AC to be valid, perform attachment on the User's AID, establish a mapping relationship between the User's AID and a Route identifier (RID) of the ASN, and report the mapping relationship to the ILR of the user;

the ILR is configured to store the mapping relationship between the User's AID and the RID of the ASN; and after receiving a mapping relationship inquiring request initiated by other ASNs according to the User's AID, return the RID corresponding to the User's AID to the ASN initiating the inquiring request.

Preferably, the ASN is further configured to:

after receiving the network access response, if the User's AID information is authenticated by the AC to be valid, establish a mapping table between the User's AID and the AID of the public device, and set an attribute of the User's AID as a virtual AID; and when a message with the virtual AID being a source address or a destination address is received, inquire the mapping table to obtain the AID of the public device, and perform traffic statistic or charging on the public device.

Preferably, the ASN is further configured to prohibit the managed public device from accessing a user or a device except for the AC.

The above implementation scheme is based on the Subscriber Identifier and Locator Identifier Separation Network, and implements accessing the network on the public device by a user using uniqueness of a User's AID in the whole network. Compared with the traditional IP network at present, with the above implementation scheme, effective tracking and tracing can be performed on the user who accesses the network over the public device on the basis of the uniqueness of the AID in the whole network by making full use of the advantage of the Subscriber Identifier & Locator Identifier Separation Network.

PREFERRED EMBODIMENTS OF THE PRESENT INVENTION

Figure 1:
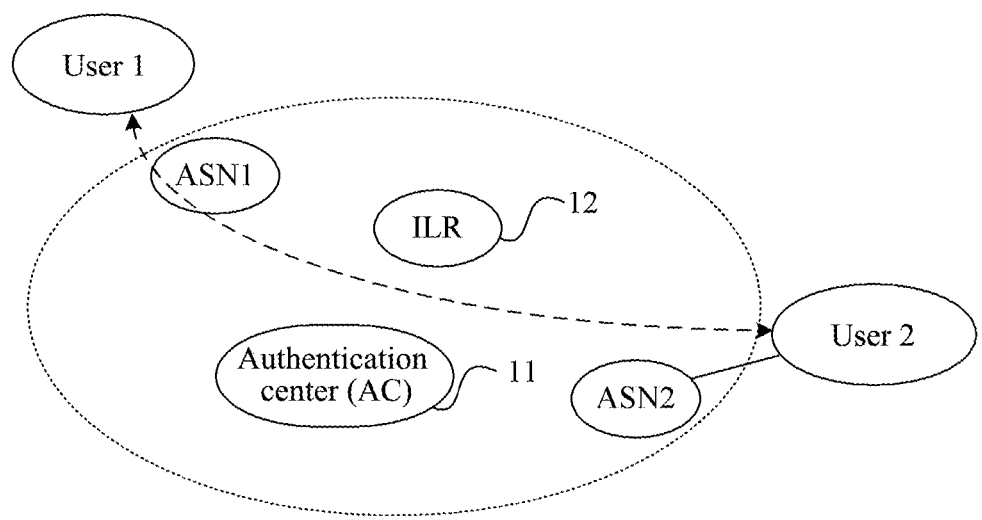
FIG. 1 is a diagram of architecture of a SILSN according to an embodiment of the present invention.

In order to solve the problem of the duality of Identity and location for the existing traditional IP address, the present invention presents a system architecture of a Subscriber Identifier and Locator Separation Network (SILSN for short) illustrated in FIG. 1. In FIG. 1, the SILSN system is comprised of an Access Service Node (ASN for short), a user, an Authentication Center (AC for short) 11 and an Identification and Location Register (ILR for short) 12 etc.

Wherein, the ASN is primarily responsible for the access of the user, and undertakes functions such as charging, switching etc.; the ILR is configured to undertake the location registration and identity and location identification of the user, and location inquiring functions; and the AC is responsible for the authentication of the access of the user.

There are two kinds of identifiers in the above SILSN architecture network, i.e., an Access Identifier (AID for short) and a Routing Identifier (RID for short). Wherein, the AID is a User's access identifier which is only allocated to the user for use and is unique in the whole network, and the access identifier can be uniquely unchanged in the transmission of the network, and when the user moves in the network, the AID will not be changed, and is unique in the whole network. The RIDs of the ASNs to which users are attached respectively are used between users to route communication messages. It should be illustrated that the access identifier and the location identifier can have different names in different SILSN architecture, but the substances thereof are the same.

The above SILSN network has the following features: each user in the network can access only after strict authentication, and the user carries his/her own AID in the data packets transmitted in various services at the same time, and each data packet transmitted by the user must pass the ASN authentication, to ensure the data packet transmitted by the user carries his/her own access identifier, and will not palm off other User's AID to access the network, and the access identifier will maintain the same when being transmitted in the network, and when the user moves or switches, the identifier will not be changed.

In the example of FIG. 1, users User1 and User2 have unique access identifier AID1 and AID2 respectively, and User1 and User2 pass through access networks ASN1 and ASN2 respectively. Wherein, User2 normally accesses the network, i.e. User 2 uses his/her own User Equipment (UE for short) to access the network, and the AID of the UE thereof is the AID used by User2 to be bound to the service. While User1 accesses the network over a public device. Since the AID of the public device is not the AID owned by User1, the AID of the public device cannot be bound to the application services of the user.

For the above proposed SILSN network, in order to solve the problem, the basic implementation idea of the present invention is as follows: a network manager storing the User's AID and password in the AC, and the user utilizing his/her own AID and password to access the network; and the AC performing authentication on the User's AID and password, and when the user passes the authentication, using the User's AID as a virtual AID to be bound to the public device.

Thus, the binding between the User's AID and the application services can be achieved: the public device using the User's AID as the AID of the local device, and the application programs on the device using the User's AID when processing network related events.

More specifically, the present invention uses the following scheme to solve the problem of accessing the network over the public device based on the SILSN network:

a user inputting an AID and authentication information over the public device, and initiating a network access request;

after receiving the network access request, an ASN transmitting the received network access request to an AC to authenticate validity of the User's AID information, and forwarding a network access response returned by the AC to the public device; and after the public device receives the network access response, if the User's AID information is authenticated by the AC to be valid, the public device using the User's AID as a virtual AID, and using the virtual AID to transmit/receive messages of the user.

Wherein, the AC can locally store the User's AID and the authentication information when the user accesses the network, and after receiving the network access request of the user, performing the following authentication on the validity of User's AID information: locally inquiring corresponding authentication information according to the User's AID in the network access request, and if the inquired authentication information is in accordance with the authentication information in the network access request, determining that the user passes the authentication; otherwise, determining that the user does not pass the authentication.

Further, if the authentication is passed, the User's AID is carried in the returned network access response by the AC.

Further, if the authentication is passed, the ASN performs attachment on the User's AID according to the network access request or the User's AID in the network access response, establishes a mapping relationship between the User's AID and a RID of the ASN, and reports the mapping relationship to an Identification and Location Register (ILR) of the user.

Further, if the authentication is passed, the ASN establishes a mapping table between the User's AID and the AID of the public device; and meanwhile, setting an attribute of the User's AID as a virtual AID, and when a message with the virtual AID being a source address or a destination address is received, inquires the mapping table to obtain the AID of the public device, and performs traffic statistic on the public device.

Further, the ASN will prohibit the public device from accessing a user except for the AC.

The implementation of the technical scheme of the present invention will be further described in detail in conjunction with accompanying drawings and specific embodiments. It should be illustrated that, the contents of the present invention can be explained by the following embodiments, but are not limited to the following embodiments.

Figure 2:
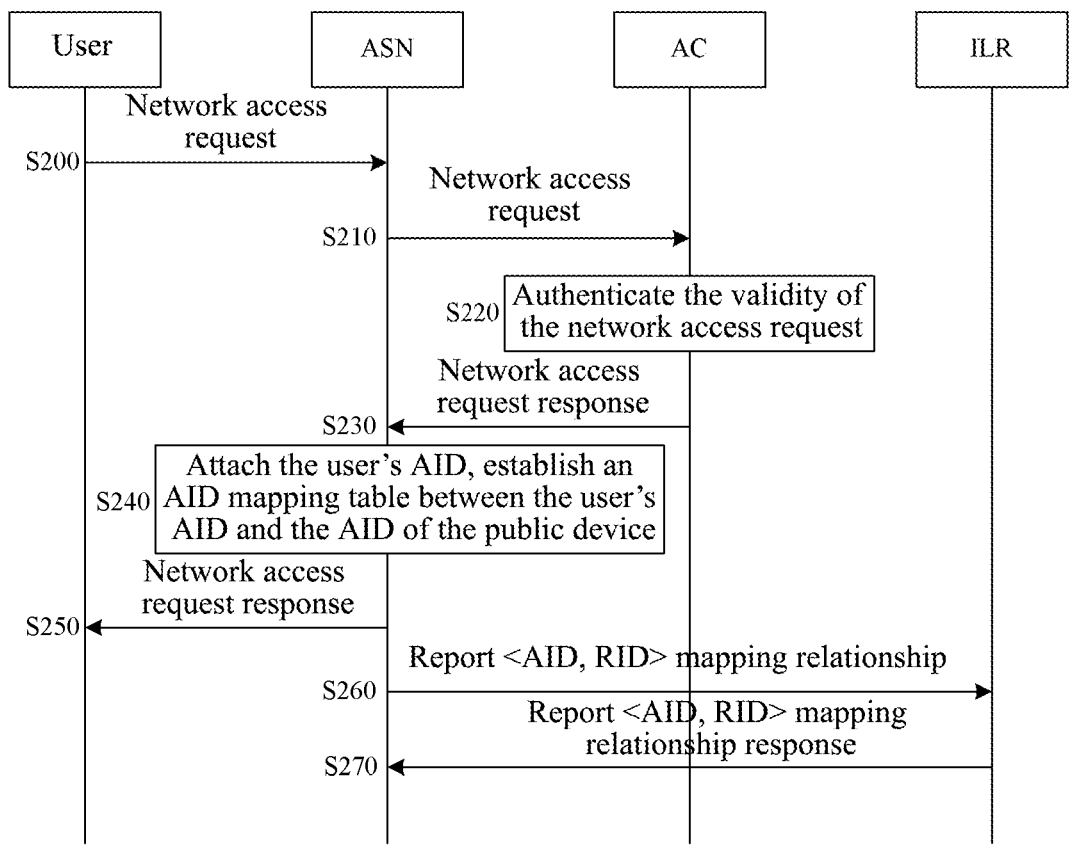
FIG. 2 is a flowchart of a user accessing a network over a public device according to an embodiment of the present invention.

FIG. 2 illustrates a flow of a user accessing a network over a public device using an access identifier. The user inputs his/her own AID and password over the public device and requests to access the network. The access request thereof is transmitted to an AC for processing, and the AC authenticates the access request from the public device according to the stored User's AID and password information. The flow can specifically comprise the following steps.

In S200, the user inputs an AID over the public device, then transmits a network access request message comprising the User's AID and authentication information, wherein, the authentication information can be a password, a authentication code or other information, and in this implementation, the authentication code is a password.

The source AID in the request message is an AID of the public device, and the destination is the AC.

In S210, the ASN receives the User's network access request message from the public device, and forwards the request message to the AC for processing.

In S220, the AC receives the network access request information from the public device, extracts the User's AID and password in the request message, compares the User's AID and the password with the corresponding AID and password stored in the AC, and if they are consistent, the authentication is successful; otherwise, the authentication fails.

In S230, the AC transmits a network access request response message to the user; optionally, if the authentication is successful, the User's AID is carried in the response message.

In S240, the ASN receives the User's network access authentication response message from the AC, and if the authentication passes, the ASN performs attachment on the User's AID, establishes a <AID, RID> mapping relationship with the ASN's own RID, and meanwhile establishes an AID mapping table in a form of <AID, AID> for the user and the public device according to the AID in the received authentication response message or according to the AID in the network access request message received in step S210; alternatively, the ASN sets the attribute of the User's AID as the User's virtual AID; and if the authentication fails, the ASN forwards the network access authentication response message from the AC directly.

In S250, after the public device receives an identity information authentication request response message, if the authentication passes, the public device uses the User's AID as one virtual AID in its own system according to the AID in the received authentication response message or according to the AID input by the user in step S200, and all network behaviors of the user occurring on the public device use the virtual AID as a source AID.

Thereafter, the public device will use the User's AID to transmit/receive data messages etc., for example, when the user accesses a File Transfer Protocol (FTP) server, the source AID in the transmitted access request message is a virtual AID.

In S260, the ASN reports the User's <AID, RID> mapping relationship to the ILR.

Wherein, the purpose of the ASN establishing the User's <AID, RID> mapping relationship and reporting the mapping relationship to the ILR is to illustrate that the User's AID is attached on the ASN, which facilitates other ASNs to inquire the corresponding RID information from the ILR according to the User's AID, and thus transmit a message to the ASN according to the inquired RID information.

In S270, after recording or updating the User's <AID, RID> mapping relationship, the ILR returns and reports the mapping relationship response information to the ASN.

Thereafter, after receiving the mapping relationship inquiring request for the user from other ASNs, the ILR returns the RID corresponding to the User's AID to the inquiring party.

It should be illustrated that in the above steps, S260 and S270 can also be implemented before S250. The order of the implementation depends from the interior implementation method of the ASN.

Figure 3:
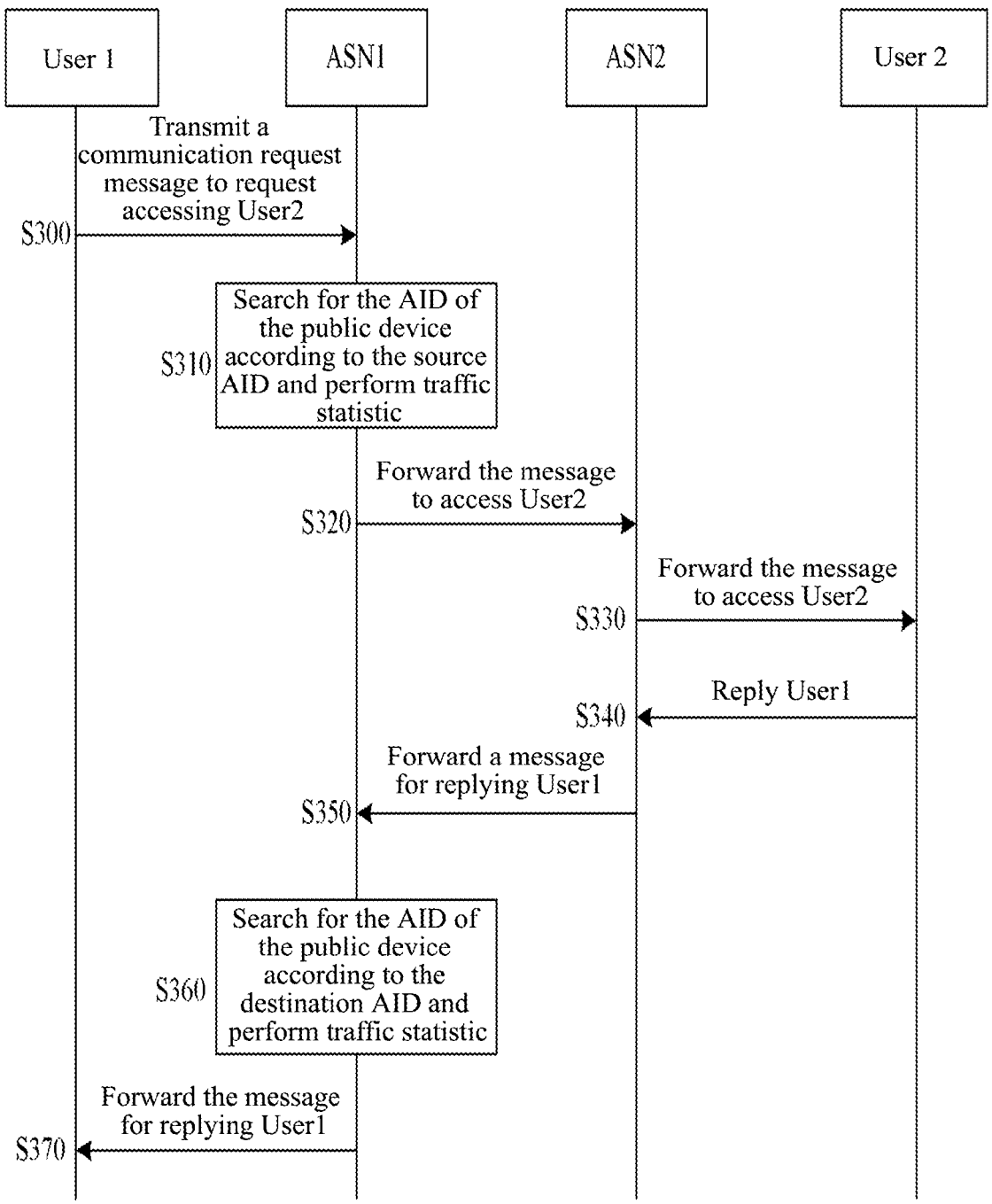
FIG. 3 is a flowchart of forwarding a message when a user surfs the Internet over a public device according to an embodiment of the present invention.

FIG. 3 illustrates a flow of forwarding a message when a user surfs the Internet over a public device. The behavior of the user surfing the Internet over the public device is basically the same as the user surfing the Internet over his/her own device, which complies with the requirements on the tracking and tracing of the user by the network manager and regulatory agencies, and meanwhile also solves the problem of binding between the User's AID of the network layer and the services of the application layer. The differences are in that the ASN needs to perform traffic statistic on the public device, to implement the management on the public device. The flow can specifically comprise the following steps.

In S300, User1 transmits a communication request message to User2 over the public device, wherein, a source AID in the message is an AID of User1, and the destination AID is an AID of User2.

Wherein, in addition to the public device having its own AID, the system thereof also allows the user who successfully accesses the network over the public device to attach his/her AID to the public device. That is, when the User's AID is attached to the public device, all AIDs which are used by the public device to transmit/receive the messages are the User's virtual AID, instead of the AID of the public device itself. When the user exits the network, the virtual AID will also be deleted; thereafter, the AID which is used by the public device to transmit/receive the messages is the AID of the public device itself.

In S310, ASN1 receives a message from the public device, detects that the source AID is a virtual AID, then uses this AID to inquire the mapping table between User1's AID and the AID of the public device to obtain the AID of the public device, and performs the traffic statistic on the public device.

In S320, ASN1 inquires and acquires the corresponding RID (the RID of ASN2) from the ILR according to the destination AID, i.e., User2's AID, in User1's communication request message, and encapsulates the RID of ASN1 as a source RID and the RID of ASN2 as the destination RID in the message, and route and forward the message to ASN2.

In S330, after receiving the above message, ASN2 releases the encapsulated RID and then forwards User1's communication request message to User2.

In S340, User2 replies User1's communication request, wherein, the source address in the reply message is User2's AID and the destination address is User1's AID.

In S350, after encapsulating the source RID (the RID of ASN2) and the destination RID (the RID of ASN1) in the reply message, ASN2 forwards the reply message to ASN1.

The present example is described by example of User1 initiating communication to User2, and if it is User2 that initiates communication to User1, ASN2 inquires ILR according to the destination address, i.e., User1's AID, in User2's communication request message to obtain the corresponding RID of ASN1, then encapsulates the obtained corresponding RID in the message, and forwards and routes the message to ASN1. The communication flow is similar to that in the present example, and will not be described further here.

In S360, ASN1 receives the message from ASN2, checks that the destination AID is a virtual AID, then inquires the mapping table between User1's AID and the AID of the public device using the AID to obtain the AID of the public device, and performs traffic statistic on the public device.

In S370, after releasing the RID encapsulated in the message, ASN1 forwards User2's reply message to User1.

At this point, the flow of the user forwarding the message over the public device ends.

It should be illustrated that, ASN1 inquiring the AID of the public device using the mapping table between User1's AID and the AID of the public device and performing traffic statistic is only one of functions for the ASN. The function which can be owned by ASN1 according to the AID mapping table is not limited to the traffic statistic, and further comprises functions such as recording a specific position where User1 accesses the network, performing charging on the public device, etc.

Figure 4:
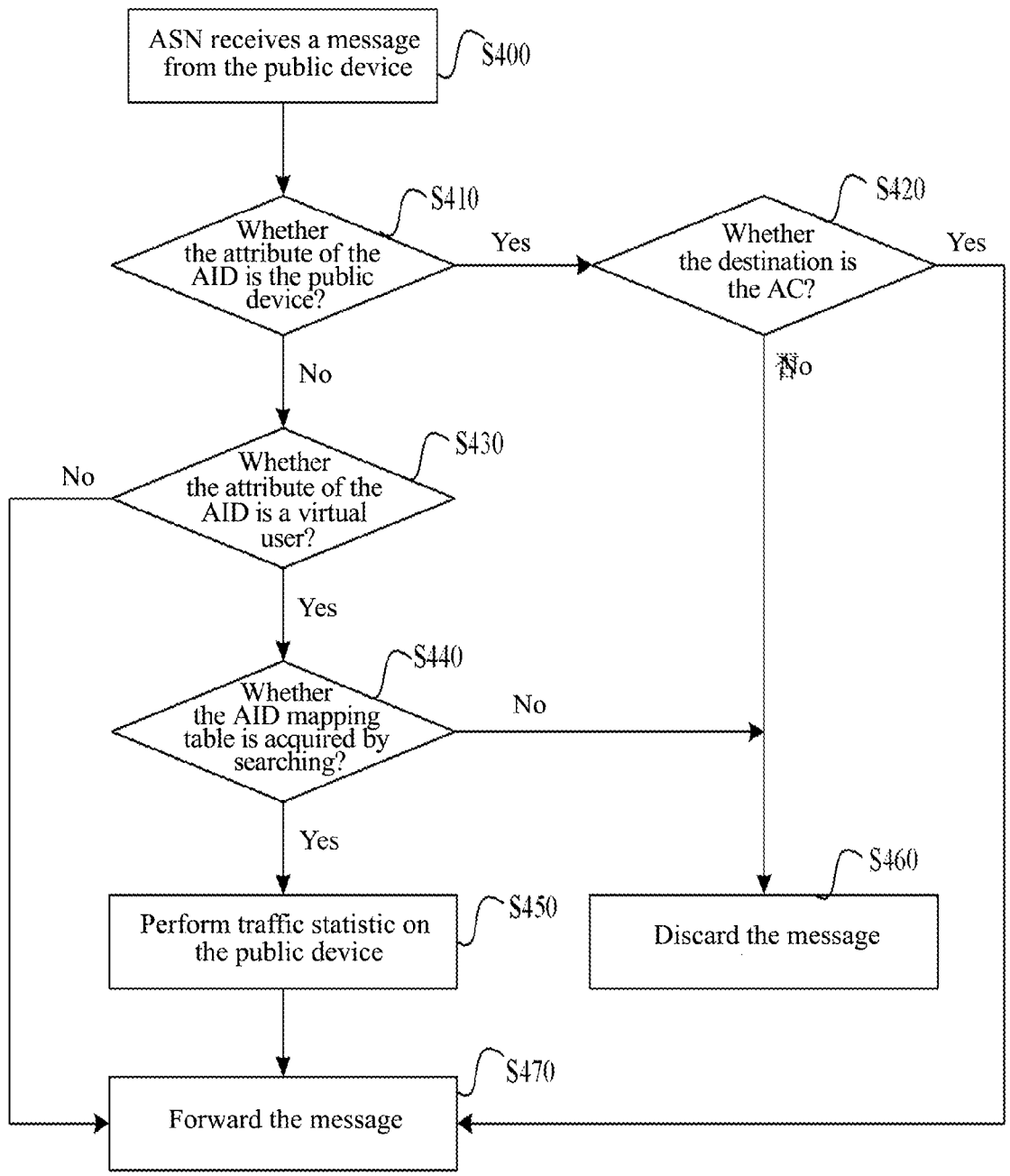
FIG. 4 is a flowchart of an ASN processing a message from a public device according to an embodiment of the present invention.

FIG. 4 illustrates a flow of an ASN processing a message from a public device. In the example, the ASN needs to check whether the source AID is an AID of the public device. If the AID is the AID of the public device, it needs to prohibit the public device from directly accessing a destination which is not the AC. The flow can specifically comprise the following steps.

In S400, the ASN receives a message from the public device (for example, a PC in an Internet cafe).

In S410, the ASN extracts a source AID in the message, determines whether the source AID is the AID of the public device, and if the source AID is the AID of the public device, skip to step S420; otherwise, skip to step S430.

In this step, the ASN can search for the source AID according to a list of all AIDs thereon, and then determine whether the source AID is the public device by looking over the attribute of the source AID. There may be many types of attributes of the AID, for example, the above attribute of the public device, and the virtual AID, an AID needs to be redirected, and so on.

In addition, the AID can further determine whether the above source AID is the public device by many other modes, for example, the ASN can back up all the AIDs of the public device thereon, and separately store the AIDs as an AID list of the public devices; and when receiving the message, the ASN determines whether the source AID is the public device according to the backed up AID list of the public device etc. This will not be further listed here.

In S420, the ASN determines whether the destination of the message is the AC, and if the destination of the message is the AC, skip to step S470, and the message is normally forwarded; otherwise, skip to step S460, and the message is discarded.

In S430, if the AID is not the AID of the public device, the ASN determines whether the attribute of the AID is a virtual user, i.e., whether the attribute is the virtual AID for the user to access the network over the public device; and if the attribute is a virtual user, skip to step S440; otherwise, skip to step S470, and the message is normally forwarded.

In S440, whether there is an AID mapping table between the virtual AID and the corresponding AID of the public device is inquired according to the virtual AID for the user to access the network over the public device, and if there is an AID mapping table, skip to step S450; otherwise, skip to step S460, and the message is discarded.

In S450, the ASN performs traffic statistic on the public device according to the inquired AID mapping table, and skip to step S470.

In S460, the message is discarded; and the flow ends.

In S470, the message is normally forwarded. It should be illustrated that S470 is skipped from step S420, S430 or S450.

At this point, the flow of the ASN processing the message from the public device ends.

Figure 5:
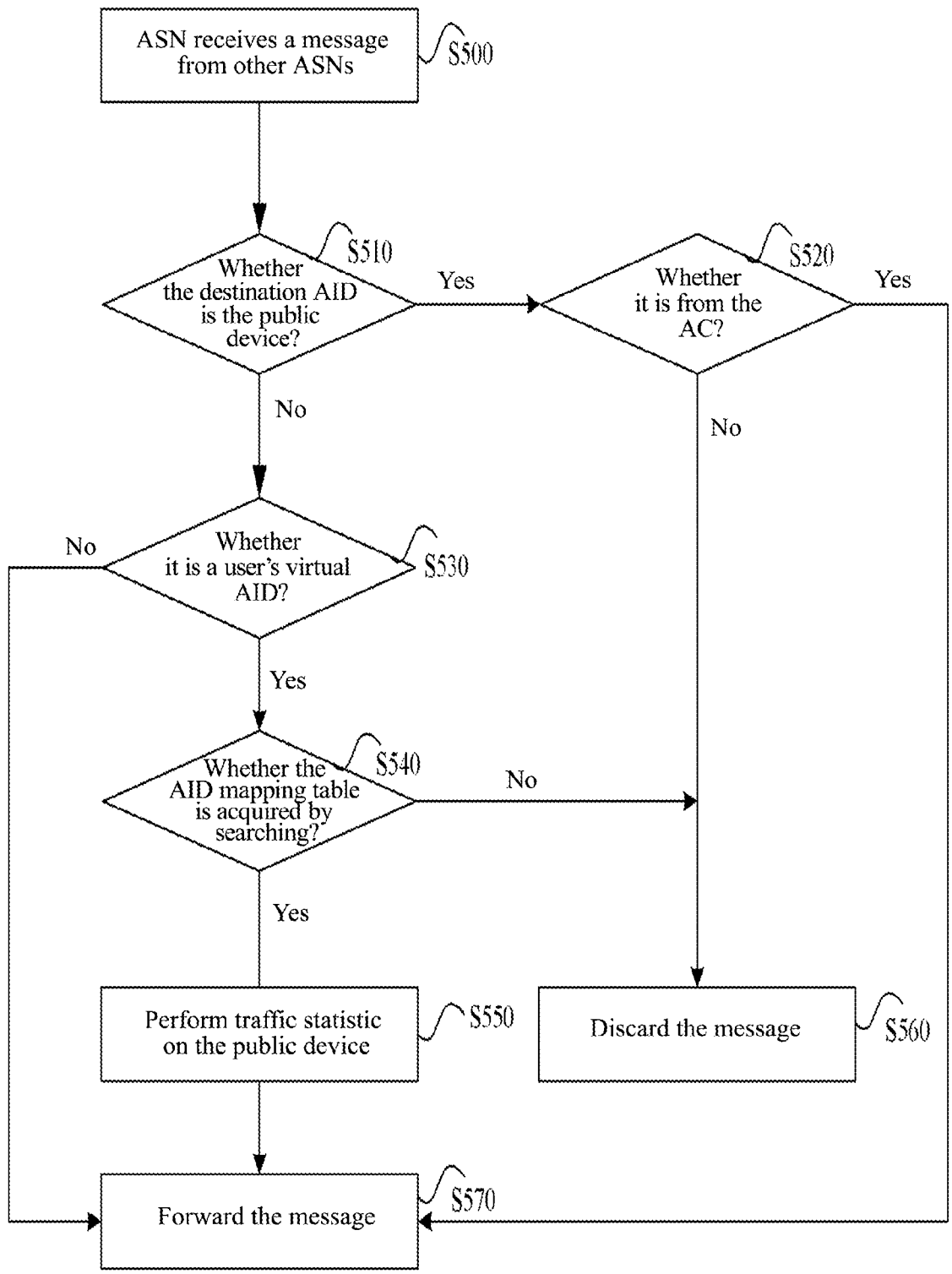
FIG. 5 is a flowchart of an ASN processing a message from other ASNs according to an embodiment of the present invention.

FIG. 5 illustrates a flow of an ASN processing a message from other ASNs. In the example, the ASN needs to determine whether the destination AID is a User's virtual AID for accessing the network over a public device. The flow can specifically comprise the following steps.

In S500, the ASN extracts a source AID and a destination AID of the message.

In S510, the ASN determines whether the destination AID is an AID of the public device; if the destination AID is an AID of the public device, then skip to step S520; otherwise, skip to step S530.

In S520, the ASN determines whether the message is from an AC, and if the message is from an AC, skip to step S570, and the message is normally forwarded; otherwise, skip to step S560, and the message is discarded.

In step 530, the ASN determines whether the destination AID of the message is the User's virtual AID for accessing the network over the public device; and if the destination AID of the message is the User's virtual AID, then skip to step S540; otherwise, skip to step S570, and the message is normally forwarded.

In S540, the destination AID of the message is the User's virtual AID for accessing the network over the public device, and the ASN inquires whether there is an AID mapping table between the destination AID and an AID of the public device according to the destination AID; and if there is an AID mapping table, skip to step S550; otherwise, skip to step S560, and the message is discarded.

In S550, the ASN performs traffic statistic on the public device according to the AID of the public device; and skip to step S570.

In S560, the ASN discards the message; and the flow ends.

In S570, the ASN normally forwards the message, and it should be illustrated that this step is skipped from steps S520, S530 and S550.

At this point, the flow of the ASN processing the message from the other ASNs ends.

Figure 6:
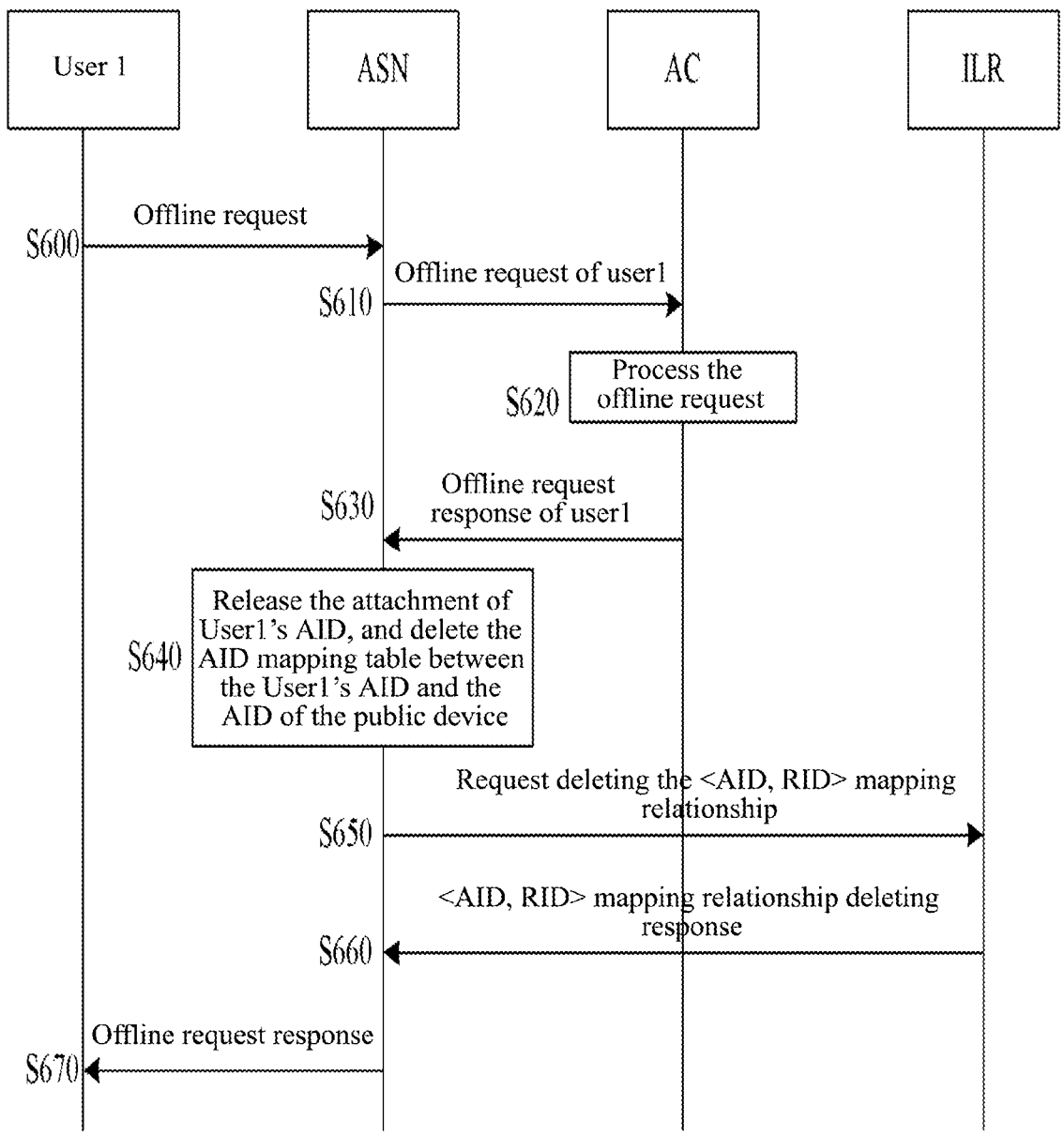
FIG. 6 is a flowchart of a user being offline according to an embodiment of the present invention.

FIG. 6 is a flow of a user being off line. The user has accessed the network over a public device, and when the user needs to be offline after being in an online state, the user transmits an offline request to the AC, and all the AC, ILR and ASN need to delete records related to the User's AID. The flow specifically comprises the following steps.

In S600, User1 who accesses the network over the public device transmits an offline request to the AC through the ASN.

In S610, the ASN receives the offline request of User1, and forwards the received offline request to the AC for processing.

In S620, the AC receives the offline request of User1, deletes the online state of User1 in the network.

In S630, the AC transmits an offline request response to the ASN to notify the ASN to delete information related to User1.

In S640, the ASN receives an offline request response message from the AC, releases the attachment of User1's AID, and meanwhile deletes an AID mapping table between User1's AID and the AID of the public device.

In S650, the ASN reports an update of User1's <AID, RID> mapping relationship to the ILR, to request to delete User1's <AID, RID> mapping relationship.

In S660, the ILR deletes User1's <AID, RID> mapping relationship, and transmits a mapping relationship deleting response to the ASN.

In S670, the ASN transmits an offline success response message to the public device, and deletes User1's virtual AID attached to the public device.

At this point, the flow of the user being offline ends.

A person having ordinary skill in the art can understand that all or a part of steps in the above method can be implemented by programs instructing related hardware, and the programs can be stored in a computer readable storage medium, such as a read-only memory, disk or CD-ROM etc. Alternatively, all or a part of steps in the above embodiments can also be implemented by one or more integrated circuits. Accordingly, each module/unit in the above embodiments can be implemented in a form of hardware, or can also be implemented in a form of software functional module. The present invention is not limited to any particular form of a combination of hardware and software.

The above description is only the preferred embodiments of the present invention and is not intended to limit the present invention. The invention can have a variety of changes and variations for those skilled in the art. Any modification, equivalent substitution, improvement etc. which are made within the spirit and principle of the present invention should belong to the protection scope of the present invention.

INDUSTRIAL APPLICABILITY

The method and system for accessing the network over the public device which are provided by the present invention implement accessing the network on the public device by a user using uniqueness of a User's AID in the whole network; and can perform effective tracking and tracing on the user who accesses the network over the public device on the basis of the uniqueness of the AID in the whole network by making full use of the advantage of the Subscriber Identifier and Locator Identifier Separation Network.

What is claimed is:

1. A method of accessing a network over a public device, applied to a locator/ID separation protocol (LISP) network, a user's Access Identifier (AID) which is used as a source address or destination address of user equipment in message transmission, the method comprising:

a user inputting the AID and authentication information over the public device, and initiating a network access request where the source address is an AID of the public device;

after receiving the network access request, an Access Service Node (ASN) transmitting the received network access request to an Authentication Center (AC) to authenticate validity of the user's AID information, and forwarding a network access response returned by the AC to the public device; and after the public device receives the network access response, if the user's AID information is authenticated by the AC to be valid, the public device using the user's AID as a virtual AID, and using the virtual AID to replace the AID of the public device as the source address to transmit messages of the user.

2. The method according to claim 1, wherein, the AC is used to store the User's AID and the authentication information in the network, and after receiving the network access request of the user, performing the following authentication on the validity of User's AID information: locally inquiring corresponding authentication information according to the User's AID in the network access request, and if the inquired authentication information is in accordance with the authentication information in the network access request, determining that the user passes the authentication; and if the inquired authentication information is not in accordance with the authentication information in the network access request, determining that the user does not pass the authentication.

3. The method according to claim 2, wherein,
if the AC determines that the user passes the authentication, the User's AID is included in the returned network access response.

4. The method according to claim 2, further comprising:
after the ASN receives the network access response, if the User's AID information is authenticated by the AC to be valid, the ASN performing attachment on the User's AID, establishing a mapping relationship between the User's AID and a Route Identifier (RID) of the ASN, and reporting the mapping relationship to an Identification and Location Register (ILR) of the user.

5. The method according to claim 4, further comprising:
after the ASN receives the network access response, if the User's AID information is authenticated by the AC to be valid, establishing a mapping table between the User's AID and an AID of the public device.

6. The method according to claim 5, further comprising:
the ASN setting an attribute of the User's AID as a virtual AID while establishing the mapping table between the User's AID and the AID of the public device, and inquiring the mapping table to obtain the AID of the public device and performing traffic statistic or charging on the public device when a message with the virtual AID being a source address or a destination address is received.

7. The method according to claim 4, further comprising:
the ASN prohibiting the managed public device from accessing a user or device except for the AC.

8. The method according to claim 5, further comprising:
after the user accesses the network over the public device and is in an online state in the network, when the user is offline,
the user transmitting an offline request over the public device, and the ASN transmitting the offline request to the AC;
after deleting the online state of the user in the network, the AC transmitting an offline request response to the ASN;
the ASN releasing the attachment of the User's AID, and requesting the ILR to delete the mapping relationship between the User's AID and the RID of the ASN; and meanwhile, deleting the mapping table between the User's AID and the AID of the public device, and transmitting the offline request response to the public device; and
after receiving the offline request response, the public device deleting the User's virtual AID.

9. The method according to claim 3, further comprising:
after the ASN receives the network access response, if the User's AID information is authenticated by the AC to be valid, the ASN performing attachment on the User's AID, establishing a mapping relationship between the User's AID and a Route Identifier (RID) of the ASN, and reporting the mapping relationship to an Identification and Location Register (ILR) of the user.

10. The method according to claim 9, further comprising:
after the ASN receives the network access response, if the User's AID information is authenticated by the AC to be valid, establishing a mapping table between the User's AID and an AID of the public device.

11. The method according to claim 10, further comprising:
the ASN setting an attribute of the User's AID as a virtual AID while establishing the mapping table between the User's AID and the AID of the public device, and inquiring the mapping table to obtain the AID of the public device and performing traffic statistic or charging on the public device when a message with the virtual AID being a source address or a destination address is received.

12. The method according to claim 9, further comprising:
the ASN prohibiting the managed public device from accessing a user or device except for the AC.

13. The method according to claim 10, further comprising: after the user accesses the network over the public device and is in an online state in the network, when the user is offline,
the user transmitting an offline request over the public device, and the ASN transmitting the offline request to the AC;
after deleting the online state of the user in the network, the AC transmitting an offline request response to the ASN;
the ASN releasing the attachment of the User's AID, and requesting the ILR to delete the mapping relationship between the User's AID and the RID of the ASN; and meanwhile, deleting the mapping table between the User's AID and the AID of the public device, and transmitting the offline request response to the public device; and
after receiving the offline request response, the public device deleting the User's virtual AID.

14. The method according to claim 1, further comprising:
after the ASN receives the network access response, if the User's AID information is authenticated by the AC to be valid, the ASN performing attachment on the User's AID, establishing a mapping relationship between the User's AID and a Route Identifier (RID) of the ASN, and reporting the mapping relationship to an Identification and Location Register (ILR) of the user.

15. The method according to claim 14, further comprising:
after the ASN receives the network access response, if the User's AID information is authenticated by the AC to be valid, establishing a mapping table between the User's AID and an AID of the public device.

16. The method according to claim 15, further comprising:
the ASN setting an attribute of the User's AID as a virtual AID while establishing the mapping table between the User's AID and the AID of the public device, and inquiring the mapping table to obtain the AID of the public device and performing traffic statistic or charging on the public device when a message with the virtual AID being a source address or a destination address is received.

17. The method according to claim 14, further comprising:
the ASN prohibiting the managed public device from accessing a user or device except for the AC.

18. The method according to claim 15, further comprising: after the user accesses the network over the public device and is in an online state in the network, when the user is offline,
the user transmitting an offline request over the public device, and the ASN transmitting the offline request to the AC;

after deleting the online state of the user in the network, the AC transmitting an offline request response to the ASN;

the ASN releasing the attachment of the User's AID, and requesting the ILR to delete the mapping relationship between the User's AID and the RID of the ASN; and meanwhile, deleting the mapping table between the User's AID and the AID of the public device, and transmitting the offline request response to the public device; and after receiving the offline request response, the public device deleting the User's virtual AID.

19. A system for accessing a network over a public device, applied to a Locator/ID separation protocol (LISP) network, a user's Access Identifier (AID) which is used as a source address or destination address of user equipment in message transmission, comprising: an Access Service Node (ASN), a public device and an Authentication Center (AC), wherein, the public device comprises a processor, and a storage storing instructions that when executed by the processor enable the processor to: transmit a network access request to the ASN according to the AID and authentication information which are input by a user where the source address is the AID of the public device, after receiving a network access response, if the user's AID information is authenticated by the AC to be valid, use the user's AID as a virtual AID, and use the virtual AID to replace an AID of the public device as the source address to transmit a message of the user;

the ASN comprises a processor, and a storage storing instructions that when executed by the processor enable the processor to: transmit the network access request to the AC after receiving the network access request, and forward the network access response returned by the AC to the public device;

the AC comprises a processor, and a storage storing instructions that when executed by the processor enable the processor to perform authentication on the validity of the user's AID information, and return the network access response to the ASN.

20. The system according to claim 19, further comprising an Identification and Location Register (ILR), wherein, the processor of the ASN is further configured to, after receiving the network access response, if the User's AID information is authenticated by the AC to be valid, perform attachment on the User's AID, establish a mapping relationship between the User's AID and a Route Identifier (RID) of the ASN, and report the mapping relationship to the ILR of the user;

the ILR comprises a memory configured to store the mapping relationship between the User's AID and the RID of the ASN; and after receiving a mapping relationship inquiring request initiated by other ASNs according to the User's AID, return the RID corresponding to the User's AID to the ASN initiating the inquiring request.

21. The system according to claim 20, wherein, the processor of the ASN is further configured to:

after receiving the network access response, if the User's AID information is authenticated by the AC to be valid, establish a mapping table between the User's AID and the AID of the public device, and set an attribute of the User's AID as a virtual AID; and when a message with the virtual AID being a source address or a destination address is received, inquire the mapping table to obtain the AID of the public device, and perform traffic statistic or charging on the public device.

22. The system according to claim 19, wherein, the processor of the ASN is further configured to prohibit the managed public device from accessing a user or a device except for the AC.

* * * * *